(12) United States Patent
Dahan et al.

(10) Patent No.: US 9,722,698 B2
(45) Date of Patent: Aug. 1, 2017

(54) CHANNEL PERFORMANCE MONITORING AND AN OPTICAL COMMUNICATION SYSTEM USING SAME

(71) Applicant: ECI TELECOM LTD., Petach Tikva (IL)

(72) Inventors: David Jimmy Dahan, Ramat Gan (IL); Amitay Melamed, Moshav Zafaria (IL)

(73) Assignee: ECI TELECOM LTD., Petach Tikva (IL)

( * ) Notice: Subject to any disclaimer, the term of this patent is extended or adjusted under 35 U.S.C. 154(b) by 0 days.

(21) Appl. No.: 15/064,848

(22) Filed: Mar. 9, 2016

(65) Prior Publication Data
US 2016/0269110 A1 Sep. 15, 2016

Related U.S. Application Data

(60) Provisional application No. 62/129,979, filed on Mar. 9, 2015.

(51) Int. Cl.
*H04B 10/079* (2013.01)
*H04B 10/60* (2013.01)

(52) U.S. Cl.
CPC ... *H04B 10/07953* (2013.01); *H04B 10/0793* (2013.01); *H04B 10/07951* (2013.01); *H04B 10/60* (2013.01)

(58) Field of Classification Search
CPC .......... H04B 10/07953; H04B 10/0793; H04B 10/60; H04B 10/07951
See application file for complete search history.

(56) References Cited

U.S. PATENT DOCUMENTS

2016/0212747 A1* 7/2016 Effenberger ...... H04W 72/0453

* cited by examiner

*Primary Examiner* — Leslie Pascal
(74) *Attorney, Agent, or Firm* — Browdy and Neimark, PLLC

(57) ABSTRACT

A method is provided for carrying out channel performance monitoring in an optical communication system. The method comprising: receiving an optical signal; obtaining digitized samples associated with the optical signal; storing the digitized samples; carrying out an off-line processing of the stored samples. The off-line processing includes: using the digitized samples to determine information characterizing the at least one optical channel used for conveying the optical signal; using the determined information to estimate a value of at least one optical channel performance parameter characterizing the at least one optical channel; and forwarding the value of the at least one optical channel performance parameter to a network management element; and wherein the at least one optical channel performance parameter is estimated without a prior knowledge of information on a modulation format associated with the optical channel.

19 Claims, 11 Drawing Sheets

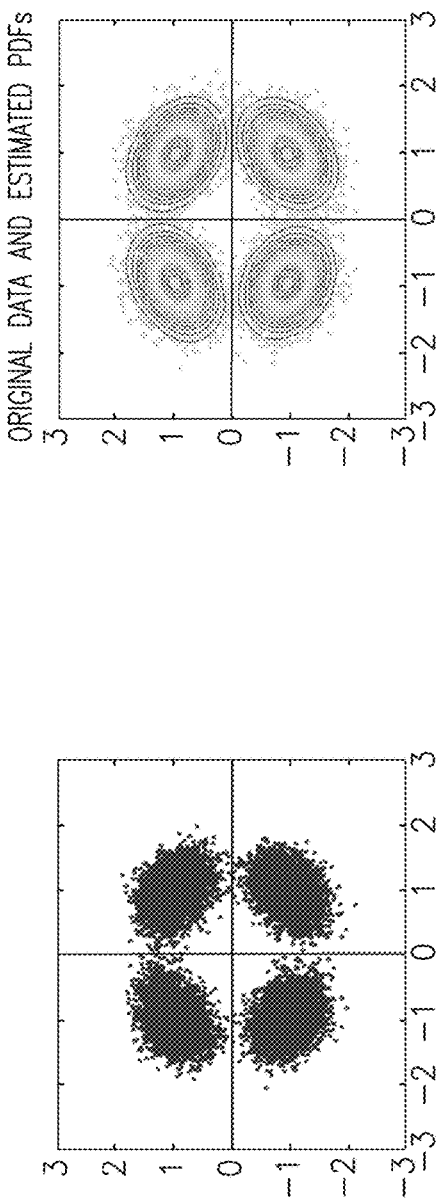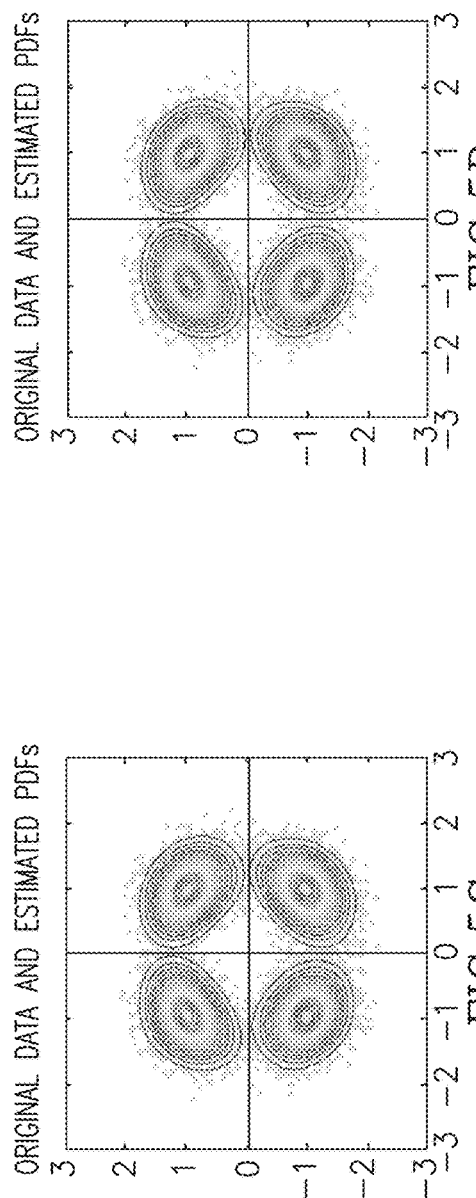

CHANNEL PERFORMANCE MONITORING AND AN OPTICAL COMMUNICATION SYSTEM USING SAME

CROSS-REFERENCE TO RELATED APPLICATIONS

This application claims priority of U.S. Provisional Patent Application No. 62/129,979, filed Mar. 9, 2015, the disclosure of which is incorporated by reference herein in its entirety.

TECHNICAL FIELD

The present invention relates to a performance monitoring system and in particularly to a system and a method for digital performance monitoring in an optical communication system.

BACKGROUND

Deployment of high speed transparent and reconfigurable optical networks requires effective, flexible and robust Channel Performance Monitoring ("CPM") techniques in order to ensure high quality of service as well as high level of resiliency.

The adoption of optical coherent detection, in which the carrier phase and amplitude are recovered at the receiver-side and down-converted to the electrical domain (as opposed to direct detection, in which the phase information is lost), provides an additional degree of freedom to encode and transmit information and consequently offers an improvement in spectral efficiency. Most importantly, this lossless optical-to-electrical signal conversion offers dramatic boost to the applicability of Digital Signal Processing ("DSP"), following high speed analog to digital conversion.

With the shift in technology towards advanced coherent modulation formats and the use of DSP devices, high spectral efficiency optical networks may be designed with almost no restriction on accumulated Chromatic Dispersion ("CD") and Polarization Mode Dispersion ("PMD"). Current technologies enable compensation of up to +/- 60 000 ps/nm accumulated CD and 30 ps of PMD. Consequently, the transmission reach is limited mainly by the Amplified Spontaneous Emission ("ASE") noise generated by the optical amplifiers as well as the optical nonlinear effects.

CPM is a requirement set in order to ensure satisfactory signal quality and to provide an in-traffic analysis of the "network health" for the Network Management System ("NMS"). In particularly, CPM enables detecting, reporting and localizing potential failures at the transmission optical link. Exemplary performance parameters that a signal performance monitoring element may provide include (but are not limited to):

1. Accumulated Chromatic Dispersion;
2. Polarization Mode Dispersion;
3. Polarization Dependent Loss ("PDL");
4. Linear Crosstalk;
5. Nonlinear Crosstalk;
6. Optical Signal to noise Ratio ("OSNR");
7. Electrical Signal to Noise Ratio ("ESNR");
8. Optical Signal to noise Ratio Margin;
9. Electrical Signal to Noise Ratio Margin;
10. Overall link impairment strength;
11. Symbol Error Rate ("SER"); and
12. Bit Error Rate ("BER").

Several methods have been proposed in the art to derive the In-Band OSNR level by estimating the in band noise level directly, even in the presence of optical filters in the link. These methods comply with the use of polarization multiplexing and coherent optical modulation formats.

A method for In-Band OSNR monitoring based on Stimulated Brillouin Scattering effect has been described in the Applicant's U.S. Pat. No. 8,660,426.

Other methods which rely upon the use of the DSP in a coherent receiver have also been proposed. For example, Z. Dong, A.P.T Lau and C. Lu, in "OSNR monitoring for QPSK and 16-QAM systems in presence of fiber nonlinearities for digital coherent receivers", Optics Express, vol. 20, no. 17, pp. 19520-19534, 2012, describe a method for fiber-nonlinearity-insensitive OSNR monitoring in digital coherent receivers, which uses incorporating and calibrating fiber nonlinearity-induced amplitude noise correlations among neighboring symbols into conventional OSNR estimation techniques from received signal distributions.

US 20040213338 discloses a method to monitor the optical channel based on Analog to Digital Converter ("ADC") samples before potential use of an equalizer. The sampled data are conveyed to a DSP unit that may be located at the receiver card or at a remote location, in order to monitor at least one performance parameter of the channel. Furthermore, the publication describes the use of recovered decided data information following a FEC decoder block, in order to increase the signal monitoring capabilities by, for example, separating the histograms of "0" and "1" bits in order to calculate eye opening and signal noise histograms. Therefore, this disclosure relies on a priori knowledge of the characteristics of the specific Forward Error Correction ("FEC") block that had been deployed, in order to provide channel performance parameters.

U.S. Pat. No. 8,824,902 describes methods for evaluating signal quality within the receiver along the path extending from the A/D convertor to the DSP or within the DSP, using an information extracting circuit, that is able to provide data for a determination means in order to detect Loss of Signal or signal deterioration, for example by analyzing histograms of the recovered constellation, with respect to a given threshold. However, this publication does not relate to the problem which the present invention faces, namely, that there are unknown proprietary techniques used to modulate/demodulate the optical channel. In other words, the recovered constellation is obtained in a non-agnostic way, by relying on known characteristics of the DSP blocks being used. Furthermore, the histogram analysis of the recovered constellation as described in this publication, is not intended for estimating histograms of each constellation point separately, but instead, considers the constellation diagram histogram as a whole.

US 20130236169 discloses dynamic performance monitoring systems and methods for optical networks to extract performance monitoring data in an optical networks based on the monitoring (via the use of a DSP device at the receiver) of existing channels or by using a probe channel with PRBS data before provisioning the service, in order to evaluate the optical path performances. The channel performance monitoring is carried out under real time traffic constraints. This disclosure pre-assumes that the network operator has a control/knowledge of the modulation techniques used for the channel and particularly for the probe channel, so that a known PRBS data stream may be relied upon.

In addition, by compensating different optical link impairments such as CD, PMD and PDL, the DSP unit of a coherent receiver can provide information of the amount of CD, PMD and PDL that the optical signal has undergone.

The ESNR level may also be estimated by comparing the recovered noisy symbols (after passing the DSP block stages before taking a decision) to the decided symbols (after decision has been taken and possible correction via the Forward Error Correction ("FEC") decoder block was affected).

Monitoring of the OSNR level of the signal is still not sufficient in order to monitor the overall OSNR system margin. Link induced physical degradations, such as received optical power to the receiver, CD, PMD, PDL and more specifically nonlinear effects, might change significantly the OSNR level to be attained for a given BER target and therefore might cause difficulties in the estimation of the overall OSNR system margin. A method for OSNR system margin monitoring, robust to link impairments and based on the evaluation of the ESNR margin with a correction factor has been described in the Applicant's PCT application published under WO 2015132776.

Optical coherent transceivers may be used to provide channel performance parameters derived from a real time DSP block at the receiver (referred to herein as in-line processing approach) that is primarily used to recover the transmitted data at the receiver side. A conventional prior art method for inline processing CPM using DSP and FEC blocks of the coherent receiver is demonstrated in FIG. 1, where the different channel performance monitors (for CD, PMD, PDL, OSNR, ESNR and OSNR margin) are derived from real time processing of the received channel signal, in order to recover the transmitted bit stream. However, such an approach of relying on real time DSP, may be appropriate at the link termination, and is not cost effective for channel performance monitoring purposes since in this case, recovery of real time transmitted data is not necessary. The cost of channel performance monitoring can therefore be reduced by the relaxing the requirement of in-line DSP block and using instead offline processing (at a lower processing rate than the channel symbol rate) of all or some of the DSP function blocks. This cost reduction allows deploying channel performance monitoring elements in strategic optical network nodes in order to get an in-traffic analysis of the "network health".

Additionally, it is preferable that the DSP based channel performance monitoring should be independent from the DSP and FEC implementation used by a particular coherent transceiver manufacturer, in order to comply with a large number of different transceiver manufacturers. Furthermore, in many cases, the DSP and FEC techniques that are used by the respective transceiver manufacturer, are proprietary information than are not disclosed to network system vendors and/or to network operators.

For example, in order to compensate the optical phase noise, one may employ a differential encoding technique at the transmitter side with an appropriate carrier phase estimation and a compensation technique at the receiver side (for example using the Viterbi & Viterbi algorithm). Information on the differential encoding mapping might not be disclosed to the network system vendor or network operator. If a pilot symbol approach is used to compensate the optical phase noise, information such as the pilot symbol word, overhead and period might not be known, making difficult to impossible for the network system vendor or for the operator to use a similar approach in order to extract channel performance parameters.

Another example of unknown information might be the particular implementation of the FEC encoder and decoder, making very difficult for the network system vendor or operator to acquire the knowledge of the decided symbols after the FEC decoding for ESNR estimation without using the precise FEC algorithm.

Therefore, it would be beneficial to have a channel performance monitoring technique based on a transceiver manufacturer agnostic DSP approach that can overcome such lack of available information associated with a particular DSP and FEC that are being used. In addition, with the shift to network virtualization and software defined optical networks paradigms, it is preferred to develop network element modules that are not restricted by a specific technology or to a specific manufacturer, in order to provide universal features.

Therefore, a method and system that enable low cost channel performance monitoring of an optical communication link that are agnostic to the transceiver manufacturer, are highly desirable.

SUMMARY OF THE DISCLOSURE

It is an object of the present disclosure to provide a novel, relatively low cost method, for channel performance monitoring in optical networks.

It is another object of the present disclosure to provide a method that complies with a partial knowledge of the optical channel characteristics. Such a partial knowledge could be for example one or more of the following:

1. Channel Modulation format or a set of possible modulation formats;
2. Channel symbol rate or a set of possible symbol rates; and
3. Channel spectral shaping or a set of possible spectral shaping.

In addition, there is a partial and rather limited knowledge of different DSP and FEC techniques implemented by the respective transceiver manufacturers at the transmitter and receiver sides. A limited knowledge of the DSP and FEC techniques implies that one may be aware of the general context of a used technique but without having the specific knowledge on how it is being explicitly implemented. Examples of limited knowledge on DSP and FEC blocks can be at least one of the following:

1. The channel symbols are differential or non-differential encoded; and
2. Performance specifications of the transceivers' manufacturers, relating to the compensation of different link impairment via the DSP and FEC modules.

It should be understood that the method provided by the present invention is applicable to all coherent modulation formats, for example, BPSK (Binary Phase shift Keying), M-ary PAM (Pulse Amplitude Modulation), QPSK (Quaternary Phase Shift Keying), M-ary QAM (Quadrature Amplitude Modulation), and the like. In addition, the method is also applicable for cases of dual polarization versions of the above modulation formats, with both single carrier (Orthogonal Frequency Division multiplexing) OFDM approaches. Furthermore, this method may also be applied to non-coherent modulation formats such as On-Off Keying (OOK), non-coherent M-PAM, Differential Phase Shift Keying (DPSK), Differential Quadrature Phase Shift Keying (DQPSK) and the like, since non-coherent modulation formats can also be detected while using a coherent receiver.

Other objects of the invention will become apparent as the description of the invention proceeds.

According to a first aspect of the disclosure there is provided an optical communication system, comprising:

an optical transmitter configured to transmit an optical signal along at least one optical channel;

an optical receiver configured to receive the optical signal conveyed along the at least one optical channel;

one or more convertors being in communication with the optical receiver and operative to convert a received signal into digitized samples thereof;

a first Digital Signal Processing (DSP) device being in communication with one or more convertors, and configured for in-line real time processing of at least one of the digitized samples, wherein the in-line real time processing includes performing at least partial recovery of digitized samples;

a memory configured to store the at least partially recovered digitized samples;

a second DSP device being in communication with the optical receiver and/or with the memory and configured for offline processing of digitized samples of the optical signal and/or of the partially recovered stored samples; and wherein the offline processing includes:

using received samples to determine information characterizing the at least one optical channel used for conveying the optical signal;

using the determined information to estimate a value of at least one optical channel performance parameter characterizing the at least one optical channel; and forwarding the value of the at least one optical channel performance parameter to a network management element; and wherein the at least one optical channel performance parameter is estimated without a prior knowledge of information on a modulation format associated with the optical channel.

The term "a prior knowledge of information on a modulation format associated with the optical channel" as used herein throughout the specification and claims, should be understood to denote information that relates to the type of modulation format, the implemented optical channel's symbol rate, the particular implementation of the modulation format at the transmitter (such as differential encoding, pilot symbols method, FEC encoding, etc.) as well as the particular implementation of the DSP chain at the optical receiver.

It should be understood that in case the modulation format is unknown, then according to the present invention, at least a set comprising a number of possible modulation formats is known. Similarly, in case the symbol rate is unknown, at least a set comprising a number of possible symbol rates is known.

In other words, the solution provided by the present invention enables the recovery of the noisy modulation constellation diagram related to the optical channel while using a blind DSP approach (i.e. without being aware of any information that relates to which bits or symbols were used while conveying the optical signal). Such a blind DSP approach is agnostic to the real application of the DSP and FEC blocks as implemented by the specific transceiver manufacturer at both sides, at the optical transmitter as well as at the optical receiver.

In accordance with another embodiment, the at least partial recovery of digitized samples is performed by the first DSP device without a prior knowledge of information on a modulation format associated with the optical channel.

According to another embodiment, the at least one optical channel performance parameter, which is either Electrical Signal-to-Noise Ratio (ESNR) and/or preFEC Bit Error Rate (BER) and a respective estimation thereof, is estimated (e.g. after having recovered the noisy constellation in a blind way) without a prior knowledge of information (i.e. without a prior knowledge obtained before carrying out the recovery of noisy constellation diagram and without a posterior knowledge) that relates to which symbols were used while conveying the optical signal.

In accordance with another embodiment, the at least one optical channel performance parameter is either Electrical Signal-to-Noise Ratio (ESNR) and/or preFEC Bit Error Rate (BER), and a respective estimation of the performance parameter is carried out in a blind way (i.e. without being aware of any information that relates to which bits or symbols were used while conveying the optical signal).

According to another embodiment, the first DSP device is further operative to compensate for at least one impairment of an optical channel along which the optical signal has been conveyed.

By yet another embodiment, the first DSP device is further operative to estimate a value of at least one optical channel performance parameter characterizing the at least one optical channel, following the compensation provided for the at least one impairment of the optical channel.

In accordance with another embodiment, the first DSP device is installed at the optical receiver and the second DSP device is located separately therefrom (e.g. at a different electronic card of the same chassis). Alternatively, the first DSP device is installed at the optical receiver and the second DSP device is installed at a geographically remote location.

By yet another embodiment, the at least one optical channel performance parameter characterizing the at least one optical channel is a member of the group that consists of: modulation format, symbols rate, spectral shaping, and any combination thereof.

In accordance with another embodiment, the at least one optical channel performance parameter includes one or more of the following: Optical Signal to Noise Ratio (OSNR), Electrical Signal-to-Noise Ratio (ESNR), OSNR system margin, ESNR system margin, overall link impairment strength, Accumulated Chromatic Dispersion (ACD), Polarization Mode Dispersion (PMD), Polarization Dependent Loss (PDL), preFEC Bit Error Rate (BER).

According to another aspect of the disclosure there is provided a method for carrying out channel performance monitoring in an optical communication system, the method comprising:

receiving an optical signal;

obtaining digitized samples associated with the optical signal;

storing the digitized samples;

carrying out an offline processing of the stored samples, wherein the offline processing includes:

using the digitized samples to determine information characterizing the at least one optical channel used for conveying the optical signal;

using the determined information to estimate a value of at least one optical channel performance parameter characterizing the at least one optical channel; and forwarding the value of the at least one optical channel performance parameter to a network management element; and wherein the at least one optical channel performance parameter is estimated without a prior knowledge of information on a modulation format associated with the optical channel.

According to another embodiment of this aspect, the at least one optical channel performance parameter is either Electrical Signal-to-Noise Ratio (ESNR) and/or preFEC Bit Error Rate (BER) and a respective estimation thereof is carried out without any knowledge of information that relates to which symbols were used while conveying the optical signal.

In accordance with another embodiment of this aspect of the disclosure, the at least one optical channel performance parameter is either Electrical Signal-to-Noise Ratio (ESNR) and/or preFEC Bit Error Rate (BER) and a respective estimation thereof is carried out without any knowledge of information that relates to which bits were used while conveying the optical signal.

According to another embodiment, the method further comprises a step of compensating the optical signal for at least one impairment of an optical channel along which the optical signal has been conveyed.

By yet another embodiment, the method further comprises a step of estimating a value of at least one optical channel performance parameter characterizing the at least one optical channel following the compensation provided to the optical signal for the at least one impairment of the optical channel.

According to another embodiment of this aspect, the method further comprising:

carrying out a real time in-line processing of at least a portion of the optical signal received, wherein the in-line processing includes performing at least partial recovery of digitized samples.

In accordance with yet another embodiment of this aspect of the disclosure, the at least one optical channel performance parameter includes one or more of the following: Optical Signal to Noise Ratio (OSNR), Electrical Signal-to-Noise Ratio (ESNR), OSNR system margin, ESNR system margin, overall link impairment strength, Accumulated Chromatic Dispersion (ACD), Polarization Mode Dispersion (PMD), Polarization Dependent Loss (PDL), preFEC Bit Error Rate (BER).

In accordance with another aspect, there is provided an apparatus configured to enable off-line digital performance monitoring, which comprises a digital signal processing (DSP) device configured to:

access a memory to retrieve stored samples of an optical signal;

use the retrieved samples to determine information characterizing the at least one optical channel used for conveying the optical signal;

use the determined information to estimate a value of at least one optical channel performance parameter characterizing the at least one optical channel; and forward the value of the at least one optical channel performance parameter to a network management element; and wherein the at least one optical channel performance parameter is estimated without a prior knowledge of information on a modulation format associated with the optical channel.

According to another embodiment of this aspect, the at least one optical channel performance parameter is either Electrical Signal-to-Noise Ratio (ESNR) and/or preFEC Bit Error Rate (BER) and a respective estimation thereof is carried out without any knowledge of information that relates to which symbols were used while conveying the optical signal.

In accordance with another embodiment of this aspect of the disclosure, the at least one optical channel performance parameter is either Electrical Signal-to-Noise Ratio (ESNR) and/or preFEC Bit Error Rate (BER) and a respective estimation thereof is carried out without any knowledge of information that relates to which bits were used while conveying the optical signal.

According to another embodiment of this aspect, the stored samples are at least partially recovered by another DSP device configured for carrying out an in-line processing.

By still another embodiment of this aspect, the at least one optical channel performance parameter includes one or more of the following: Optical Signal to Noise Ratio (OSNR), Electrical Signal-to-Noise Ratio (ESNR), OSNR system margin, ESNR system margin, overall link impairment strength, Accumulated Chromatic Dispersion (ACD), Polarization Mode Dispersion (PMD), Polarization Dependent Loss (PDL), preFEC Bit Error Rate (BER).

BRIEF DESCRIPTION OF THE DRAWINGS

For a more complete understanding of the present invention, reference is now being made to the following detailed description taken in conjunction with the accompanying drawings wherein:

FIGS. 5A to 5D illustrate exemplary estimation results of ESNR and BER for a DP-QPSK signal using the blind recovered constellation diagram analysis;

DETAILED DESCRIPTION

In the present disclosure, the term "comprising" is intended to have an open-ended meaning so that when a first element is stated as comprising a second element, the first element may also include one or more other elements that are not necessarily identified or described herein, or recited in the claims. For the purposes of explanation, numerous specific details are set forth in order to provide a thorough understanding of the present invention. It should be apparent, however, that the present invention may be practiced without these specific details.

Figure 1:
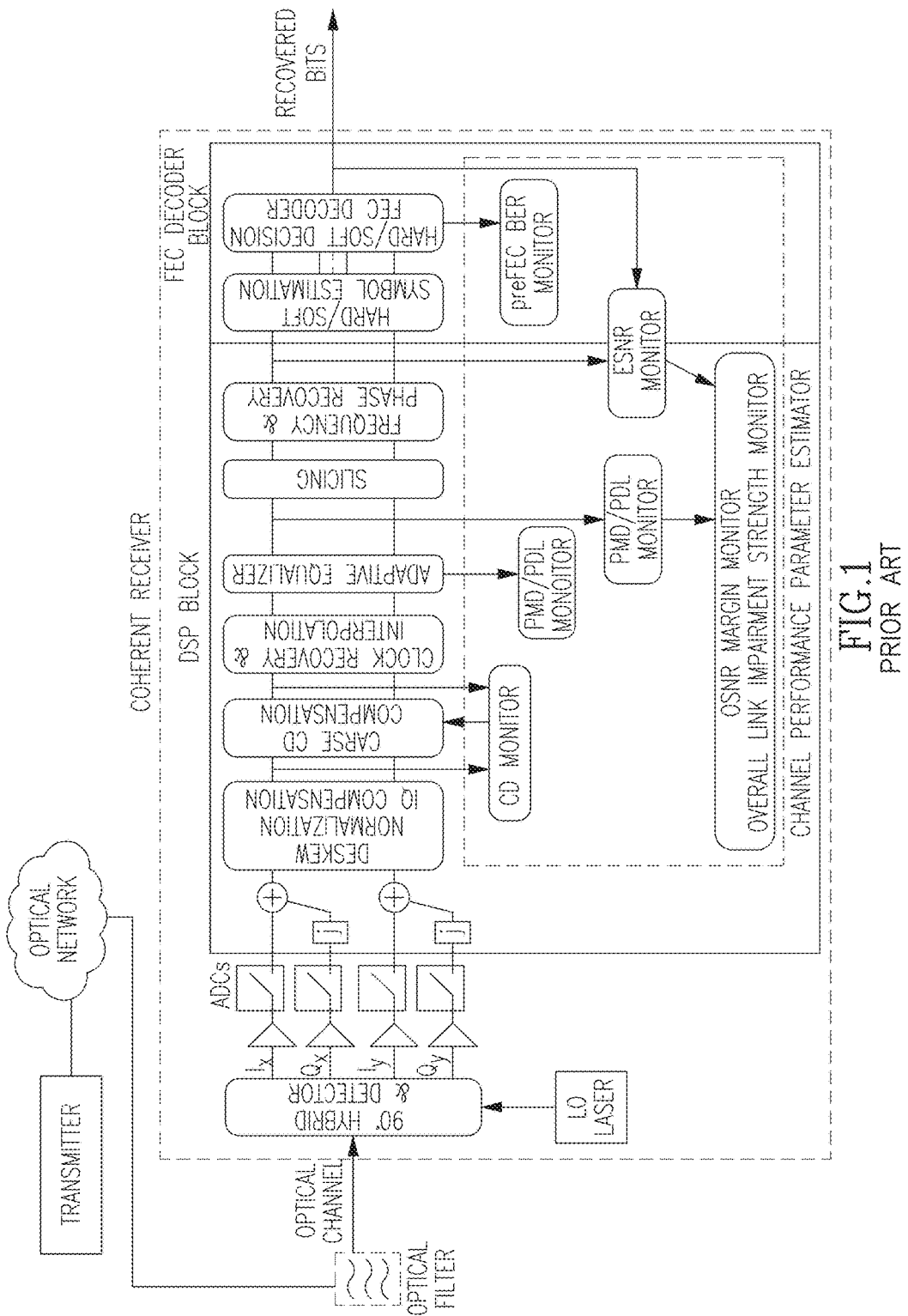
FIG. 1 illustrates a prior art CPM system that comprises a coherent receiver with inline DSP and FEC decoder blocks.

As was previously mentioned, FIG. 1 illustrates a prior art set-up of a CPM that relies on the use of the receiver part of a coherent transceiver which includes a coherent optical front end with an inline DSP and inline FEC decoder blocks, that provide the channel parameter estimations recovered under real time transmission of data.

After being conveyed along the optical network link, the optical signal arrives at its termination point and is forwarded to the coherent receiver. Before the coherent detection, the optical signal may be optionally filtered using an optical filter (colored detection) or it can be detected without passing through an optical filter (colorless detection). In the latter case, all the optical signals conveyed via the channels present along the fiber, are forwarded to the optical receiver. Colorless detection is not harmful since it is the correct selection of the local oscillator ("LO") frequency that determines which channel is coherently detected. After converting the optical signal to the electrical domain using a the coherent optical receiver front end (e.g. using mixing of a local oscillator and the incoming channel and four balanced photo-detectors), the signal is digitalized, using four high speed Analog to Digital converters ("ADCs"), and sent to a DSP device (block) in order to compensate for fiber impairments such as accumulated CD, polarization crosstalks, PMD, PDL, and the like. In addition, digital compensation of the frequency carrier offset and optical phase noise may also be performed. The impairment compensation algorithms may also provide the channel performance parameter such as accumulated CD, the PMD, PDL and OSNR levels. After applying these impairment compensation algorithms, the noisy symbols are recovered and symbol and bit decisions are performed using hard or soft detection techniques. The ESNR is estimated by measuring the average symbol power to average symbol noise power ratio. The symbol noise power is obtained by comparing the noisy symbol before the hard or soft decision and the decided symbol resulting from the output of the FEC decoder. In addition, the FEC decoder block has the ability to provide the pre FEC BER estimation. Based on the OSNR and ESNR parameters, the OSNR system margin and the overall impairment link impairment level can be estimated by using the method and systems such as those disclosed in the Applicant's PCT application, published under WO 2015132776.

However, such an approach that is based upon real time operations of the DSP and FEC blocks may be appropriate for use at the link termination but is not cost effective solely for channel performance monitoring purposes. The reason being that in such a case, the real time transmitted data recovery would not be necessary. The cost of a channel performance monitor can therefore be reduced as proposed by the present disclosure, by relaxing the requirements associated with the in-line DSP block and diverting tasks to an offline processing, possibly at a processing rate lower than the channel symbol rate, tasks associated with all or part of the DSP functional blocks. This cost reduction allows deployment of channel performance monitoring elements at strategic optical network nodes in order to get an in-traffic analysis of the "network health".

Figure 2:
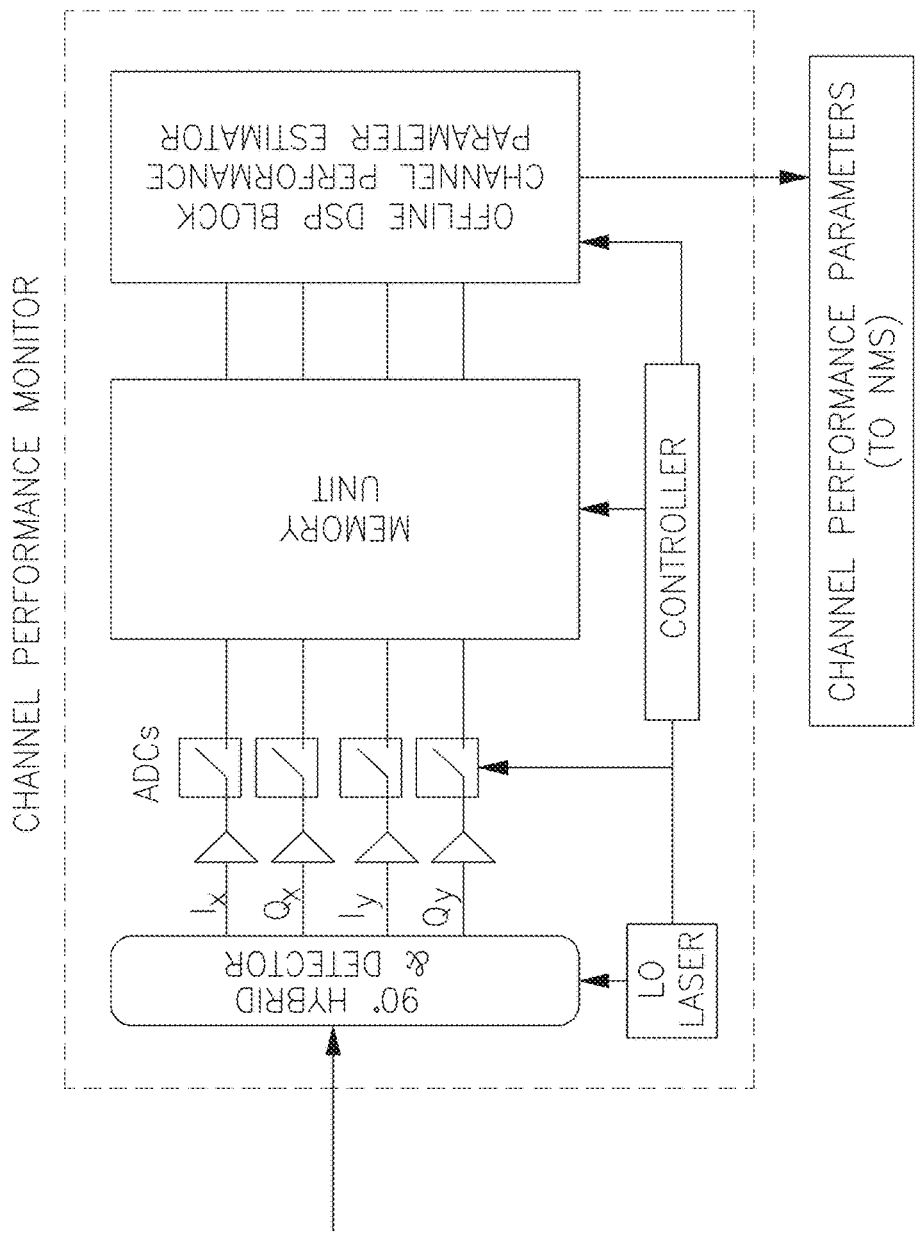
FIG. 2 illustrates a schematic implementation of an embodiment of the present disclosure by which a CPM system comprises a coherent optical receiver front end followed by ADC blocks, a memory unit and an offline DSP block, for estimating channel performance parameters.

FIG. 2 illustrates a schematic view of an embodiment of the present disclosure of a CPM technique based on an offline processing of some stored samples of the detected optical signal. After propagating through certain sections of the network link, a portion of the signal conveyed along the optical channel is tapped off and forwarded to the coherent optical receiver front end. Optical to electrical conversion of the channel's signal can be done either in a colored or colorless manner. The detected signals from the four port outputs of the optical balanced receiver are then amplified and digitalized using four high speed ADCs. The ADCs do not necessarily operate in a continuous mode. They may be activated by a control signal, for example, upon requesting a channel performance monitoring by the network management system. The sampling rate of the ADC is set according to the symbol rate of the channel to be monitored. It can be chosen as greater or equal to the Nyquist sampling rate (known as twice the symbol rate), or as a sub-Nyquist rate. The sampled data are then stored in a memory unit when a control signal enables carrying out a writing process into the memory block. The size of the stored data will depend on the number of symbols to be recovered, to enable the channel performance parameter estimations and the quantization level of the ADCs. For example, in case of a sampling rate of 60 Gsamples/s with a 8 bit quantizer, in order to store 100,000 symbols arriving at baud rate of 30 Gbaud, it will be required to have a memory size of at least 400 MByte. Another control signal will then load the saved samples into the offline DSP block that estimates the channel performance parameters by recovering the noisy constellation diagram of the saved samples. It should be noted that since the processing is carried out in an offline mode, the processing rate may be much lower than the channel symbol rate. In addition, no FEC decoder is required in the CPM process in order to extract channel performance parameters such as ESNR and pre FEC BER. The resulting estimated parameters may be conveyed to a network management element for analyzing the channel quality and/or for taking other/further actions if needed.

Additionally, it is preferable that the DSP based channel performance monitoring should be independent from the DSP and FEC implementation used by a particular coherent transceiver manufacturer, in order for these implementations to comply with a large number of transceivers manufactured by different manufacturers, as in many cases, the DSP and FEC techniques used by the transceiver manufacturers are proprietary information that would not be disclosed to network system vendors or network operators.

For example, in order to compensate the optical phase noise, one may employ a differential encoding technique at the transmitter side with an appropriate carrier phase estimation and compensation technique at the receiver side (for example the Viterbi & Viterbi algorithm). Information on the differential encoding mapping might not be disclosed to the network system vendor or network operator. If a pilot symbol approach is applied in order to compensate the optical phase noise, information such as the pilot symbol word, overhead and period might be unknown, making difficult for the network system vendor or operator to implement a similar approach in order to extract channel performance parameters.

Another example of non-disclosed information might be the particular implementation of the FEC encoder and decoder, making very difficult for the network system vendor or operator to have knowledge of the decided symbols after FEC decoding for ESNR estimation.

These problems led the inventors to develop a channel performance monitoring technique based on a DSP approach that is agnostic to the manufacturer of the transceiver, that overcomes the lack of available information associated with a particular DSP and FEC implementations. In addition, with the shift to network virtualization and software defined optical networks paradigms, it is preferred to develop network element modules that are not restricted to a specific manufacturer technology, thereby enabling to provide universal channel performance monitoring features. Agnostic channel performance monitors fall within this type of universal network element category.

Figure 3:
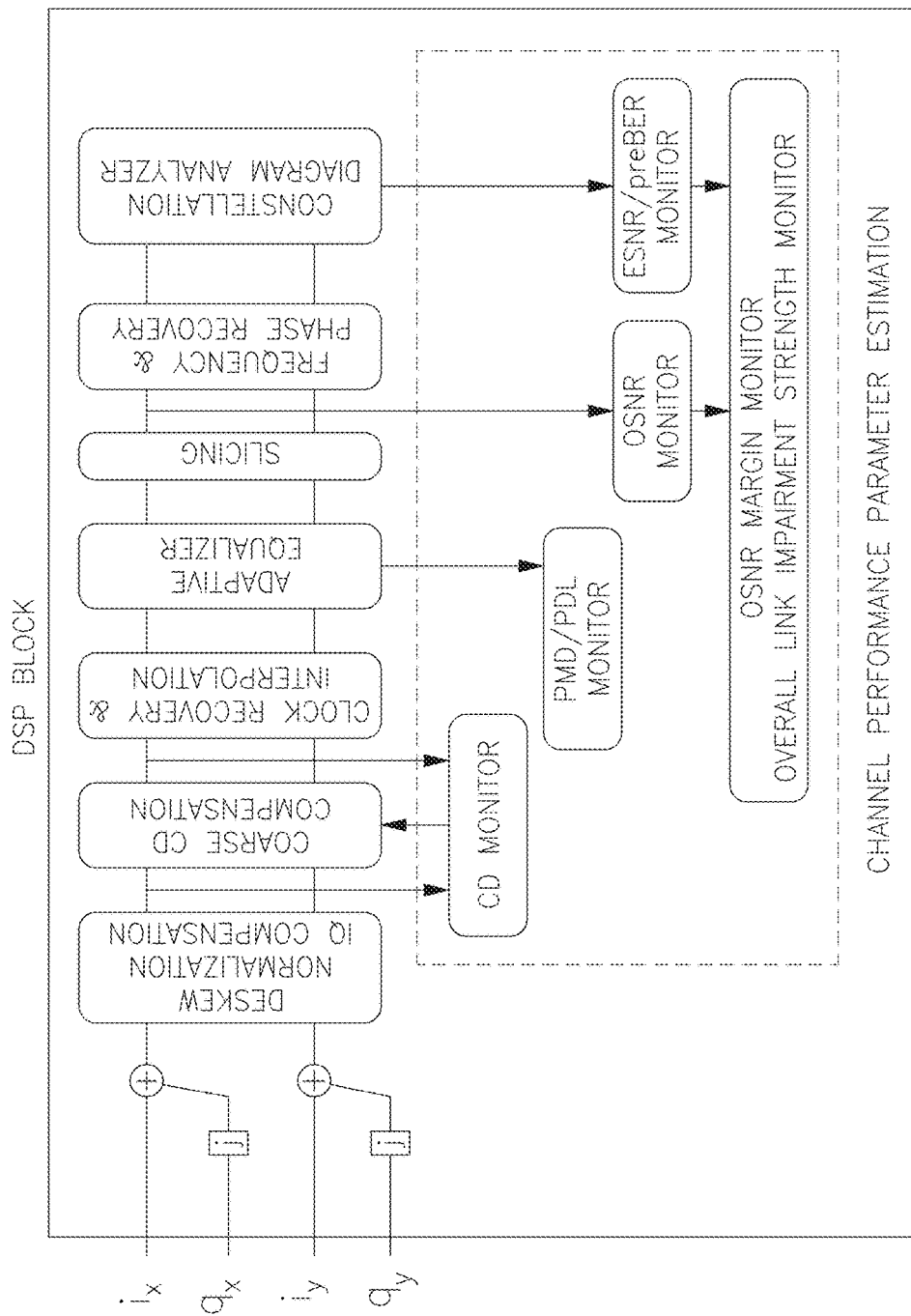
FIG. 3 illustrates schematically an embodiment of the present disclosure of a DSP block and channel performance parameter estimation.

FIG. 3 illustrates a schematic view of a DSP block configured to be used in an embodiment of the present disclosure of a CPM system. The DSP block enables recovering the noisy constellation diagram of the channel being monitored in a blind way (i.e. without the need to use known training sequence, pilot symbols or decided symbols at the receiver). In the prior art solutions, there exist a variety of blind DSP approaches for estimating and compensating the accumulated CD in a coarse way, recovering the signal polarization tributaries and compensating and estimating the residual CD, PMD and PDL. For example, the Constant Modulus Algorithm ("CMA") for QPSK modulation format or Multiple Modulus Algorithm ("MMA") for QAM modulation formats and blind carrier recovery procedures to compensate the frequency offset and phase noise (for example the Blind Phase Search, the Viterbi and Viterbi algorithm for QPSK modulation format and its derivation for QAM modulation formats). The blind impairment compensation algorithms also provide the channel performance parameters such as accumulated CD, the PMD, PDL and OSNR, ESNR, OSNR margin and the link impairment strength levels. The term "overall link impairment strength level" used herein throughout the specification and claims, should be understood as the accumulated link impairment level that has not been compensated by the DSP, such as nonlinear impairments, channel crosstalks, channel spectral narrowing, residual uncompensated CD, residual uncompensated PMD, residual uncompensated PDL, etc. After applying these impairment compensation algorithms, the noisy symbols are recovered. It should be noted that since no FEC decoder block is required for implementing the CPM technique, the estimation of the ESNR level and the preFEC BER is done via a blind analysis of the modulation constellation diagram without requiring the knowledge of the decided symbols or bits after the FEC decoder.

Figure 4:
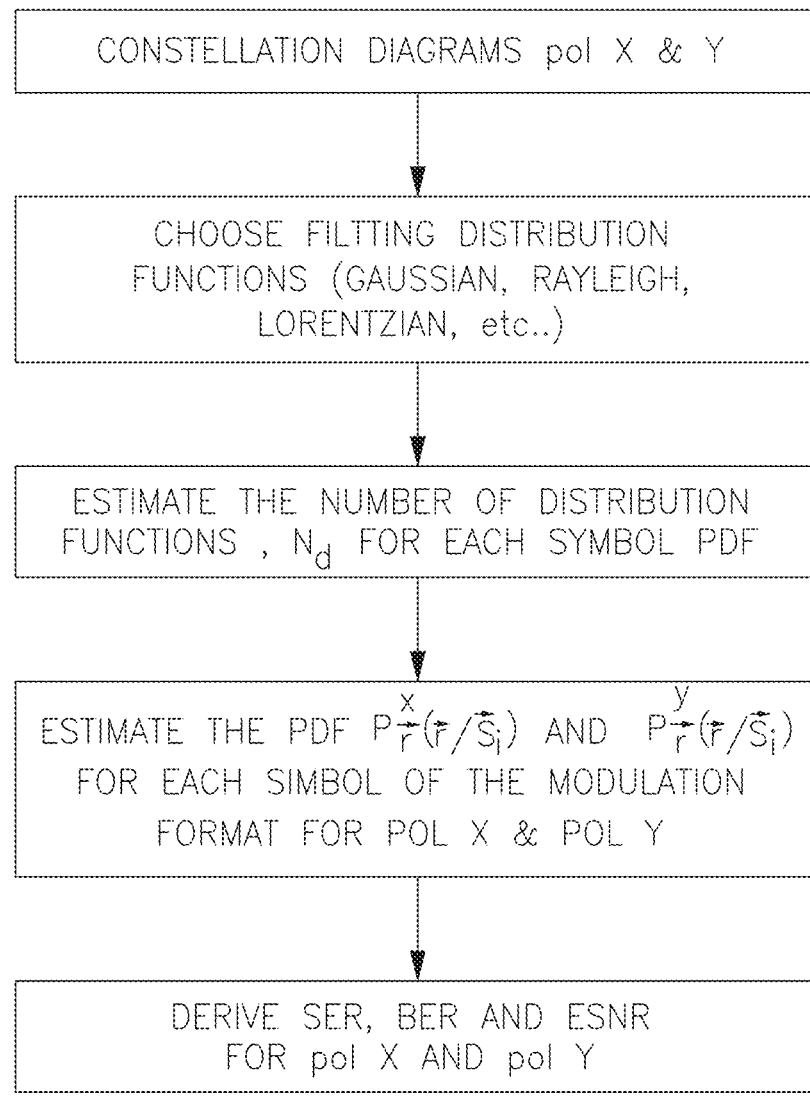
FIG. 4 exemplifies steps required according to an embodiment of the disclosure, to estimate the ESNR and the BER, based on a blind recovered constellation diagram analysis.

FIG. 4 illustrates schematically a flow chart that comprises the different steps required to estimate the ESNR and the BER, based on the blind recovered constellation diagram analysis. In order to estimate the ESNR and since no FEC decoder is used, it is not possible to know the decided symbol in the CPM unit. Therefore, the noise power is evaluated by estimating the individual probability distribution function ("pdf") of each noisy symbol of the constellation diagram (for example in the case of DP-QPSK modulation format, we have to estimate four pdfs of the four possible symbols of the modulation format at each polarization tributary). The recovered noisy symbol pdfs can be estimated using statistical methods based on the knowledge of the noisy recovered constellation diagram (at both orthogonal polarization tributaries, if polarization multiplexing is used) obtained after passing the channel detected samples through the DSP block chain.

Such a statistical method may for example be the Expectation and Maximization algorithm, applied to a mixture of multidimensional fit distribution functions. The basic fit distribution functions can be for example, Gaussian, Rayleigh, Ricean, Chi-Square or Lorentzian. The fitting pdf functions may be selected arbitrary or in an optimized way based on obtained recovered noisy constellation diagrams and assumptions relating to transmission link limitations (such as amplified spontaneous noise, nonlinear effects, optical phase noise, channel crosstalks).

Let us assume a constellation diagram of a given modulation format with M symbols at polarization tributary x, which vector representation in the n-dimensional signal vector space is given by $\{\vec{S}_1, \vec{S}_2, \vec{S}_3, \ldots, \vec{S}_M\}$ with $\vec{S}_i = [S_{i,1}, S_{i,2}, \ldots, S_{i,n}]$.

Let $\vec{r} = [r_1, r_2, \ldots, r_n]$ be the vector random variable in the n-dimensional signal vector space, representing the received recovered symbol.

The multi-dimensional pdf of the overall recovered constellation diagram, $p_{\vec{r}}^x(\vec{r}) \equiv p_{\vec{r}}^x(r_1, r_2, \ldots, r_n)$ is obtained from the multi-dimensional histograms of the recovered noisy diagram constellation. For each symbol $\vec{S}_i$ of the constellation diagram, pdf of the symbol $\vec{S}_i = [S_{i,1}, S_{i,2}, \ldots, S_{i,n}]$ is given by $p_{\vec{r}}^x(\vec{r}/\vec{S}_i)$. Therefore, we get that the pdf of the overall diagram constellation is given by:

$$p_{\vec{r}}^x(\vec{r}) = \sum_{i=1}^{M} p_{\vec{r}}^x(\vec{r}/\vec{S}_i) p^x(\vec{S}_i)$$

Where $p^x(\vec{S}_i)$ is the probability of sending the symbol $\vec{S}_i$ on polarization x.

Based on the $p_{\vec{r}}^x(\vec{r})$ distribution, the optimized number of basic distribution functions, $N_{d,i}$ is estimated.

Therefore, $$p_{\vec{r}}^x(\vec{r}/\vec{S}_i) = \sum_{j=1}^{N_{d,i}} w_{i,j,x} f_{\vec{r}}^x(\vec{r}/\vec{S}_i, j) \text{ where}$$

$$\sum_{j=1}^{N_{d,i}} w_{ij,x} = 1$$

and $f_{\vec{r}}^x(\vec{r}/\vec{S}_i, j)$ is the $j^{th}$ fit probability density function is used to characterize the pdf of $\vec{S}_i$ at the x polarization tributary. Therefore, we get another expression for the pdf of overall diagram constellation:

$$p_{\vec{r}}^x(\vec{r}) = \sum_{i=1}^{M} p^x(\vec{S}_i) \sum_{j=1}^{N_{d,i}} w_{i,j,x} f_{\vec{r}}^x(\vec{r}/\vec{S}_i, j) = \sum_{i=1}^{M} \sum_{j=1}^{N_{d,i}} \tilde{w}_{i,j,x} f_{\vec{r}}^x(\vec{r}/\vec{S}_{i,j})$$

$$\text{where } \tilde{w}_{i,j,x} = p^x(\vec{S}_i) \times w_{i,j,x} \text{ and } \sum_{i=1}^{M} \sum_{j=1}^{N_{d,i}} \tilde{w}_{i,j,x} = 1$$

The statistical method that estimates $p_{\vec{r}}^x(\vec{r}/\vec{S}_i)$ for each symbol $\vec{S}_i$ at polarization tributary x, provides the full characteristics of $p_x(\vec{r}/\vec{S}_i)$ and weights $\tilde{w}_{i,j,x}$. For example, in the case of using multidimensional Gaussian distributions as the fit pdfs, the statistical method provides for each fit pdf $f_{\vec{r}}^x(\vec{r}/\vec{S}_i, j)$, the mean vector, the covariance matrix and the weight $\tilde{w}_{i,j,x}$.

Once all the symbol pdfs are estimated, it is possible to derive the preFEC SER, preFEC BER and the ESNR for the channel at each polarization tributary. The $SER_{x/y}$ at polarization x or y is given by:

$$SER_{x/y} = \sum_{i=1}^{M} p_{x/y}(\vec{S}_i) P_{x/y}(\text{error}/\vec{S}_i)$$

Where $P_{x/y}(\text{error}/\vec{S}_i)$ is the conditional symbol error probability when the symbol $\vec{S}_i$ is sent on polarization x or y and $P_{x/y}(\text{error}/\vec{S}_i)$ is given by:

$$P_{x/y}(\text{error}/\vec{S}_i) = 1 - \left( \sum_{j=1}^{N_{d,i}} w_{i,j,x} \int_{D\{\vec{S}_i\}} f_{\vec{r}}^x(\vec{r}/\vec{S}_i, j) d\vec{r} \right)$$

With $D\{\vec{S}_i\}$ being the decision region for symbol $\vec{S}_i$.

The pre FEC $BER_{x/y}$ is derived from the $SER_{x/y}$ according to known information about the symbol mapping concept used and not necessarily the exact symbol mapping itself. For example, when differential encoding is used to overcome the cycle slip problems after carrier phase recovery, it is known that the used symbol mapping should present some of bits invariance in the symbol word when proceeding to a constant degree rotation. When non-differential encoding is used, a Gray symbol mapping may be used.

The $ESNR_{x/y}$ for polarization x or y is estimated as follows:

$$ESNR_{x/y} = \frac{\langle \|\vec{S}_i\|^2 \rangle}{\langle \|\vec{e}_{x/y}\|^2 \rangle} = \frac{\langle \|\vec{S}_i\|^2 \rangle}{\sum_{i=1}^{M} p_{x/y}(\vec{S}_i) \times N_{i,x/y}}$$

Where $\langle \|\vec{S}_i\|^2 \rangle$ is the average symbol energy and $\langle \|\vec{e}_{x/y}\|^2 \rangle$ is the average error vector energy and $N_{i,x/y} = \langle \|\vec{r} - \vec{S}_i\|^2 \rangle$ is the average square distance of the recovered noisy symbols from the symbol $\vec{S}_i$, assuming that $\vec{S}_i$ is sent on the x or y polarization. $N_{i,x/y}$ is estimated using $p_x(\vec{r}/\vec{S}_i)$:

$$N_{i,x/y} = \sum_{k=1}^{n} \int_{-\infty}^{+\infty} (r_k - S_{i,k})^2 p_{r_k}^x(r_k/\vec{S}_i) dr_k$$

Where $p_{r_k}^x(r_k/\vec{S}^i)$ is the marginal pdf of $p_{\vec{r}}^x(\vec{r}/\vec{S}_i)$.

The average SER, pre FEC BER and ESNR are obtained by averaging the calculated values of $SER_{x/y}$, pre FEC $BER_{x/y}$ and $ESNR_{x/y}$, respectively, over the two polarization tributaries.

Once the ESNR is estimated, it is also possible to estimate the OSNR system margin and the overall link impairment strength using for example the disclosure provided in Applicant's PCT application published under WO 2015132776.

FIGS. 5A to 5D illustrate exemplary estimation results of the ESNR and BER for a 120 Gb/s DP-QPSK channel using the blind recovered constellation recovering technique and blind constellation diagram analysis. It is assumed that the 120 G/s DP-QPSK channel is differential encoded and propagates over 100 km of standard single mode fiber. FIG. 5A represents the recovered noisy constellation diagram (on the polarization x tributary) of the channel after passing through the different stages of blind digital signal processing clocks to compensate the CD, polarization rotation, PMD, PDL frequency offset and carrier phase noise. 16384 noisy symbols are represented in the constellation diagram. Because of the detected optical noise and the soft differential decoding performed at the receiver, the noisy symbol distributions present correlated non-isotropic characteristics. Using a Monte Carlo measurement, the preFEC BER is $3.93 \times 10^{-3}$ and ESNR=9.24 dB. Estimations for the preFEC BER and ESNR based on recovered noisy constellation diagram and Expectation and Maximization algorithm with bivariate Gaussian distributions as fit pdf, are presented in the following table, where the fit pdf function number per symbol, $N_d$, varies from 1 to 3:

TABLE 1

|  | $N_d$ | | |
|---|---|---|---|
|  | 1 | 2 | 3 |
| BER [×10$^{-3}$] | 2.5 | 3.68 | 3.97 |
| ESNR [dB] | 9.26 | 9.24 | 9.24 |

FIGS. 5B, 5C and 5D demonstrate the isocontour levels of estimated pdfs over the original noisy constellation diagram when the fit pdf function number per symbol, $N_d$, varies from 1 to 3, respectively. It can be seen that 1 fit function per symbol is not good enough to estimate correctly the preFEC BER, while the ESNR estimated is already satisfying. In this example, it requires 3 fit functions per symbol to reach satisfactory preFEC BER estimations.

Figure 6:
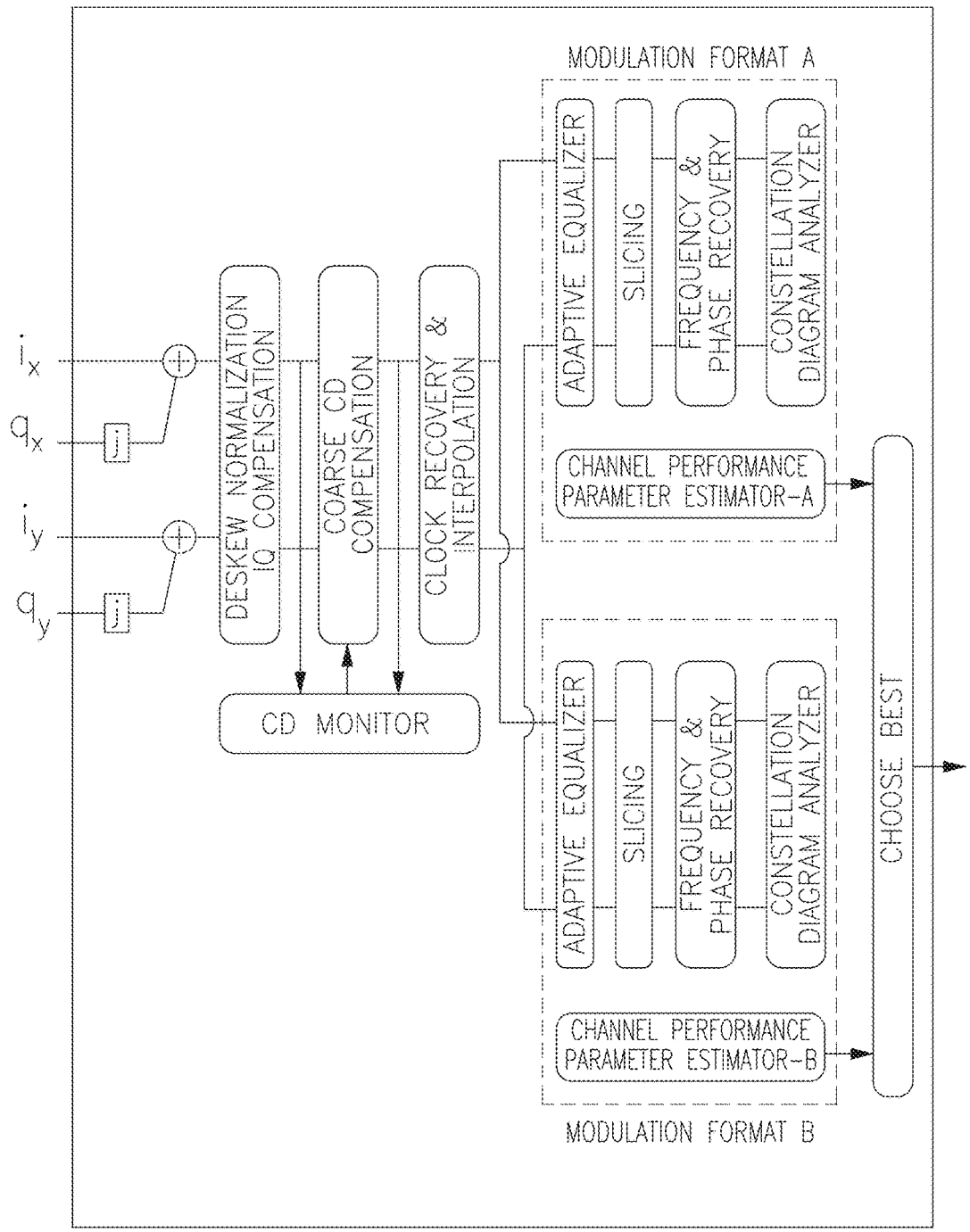
FIG. 6 illustrates schematically another embodiment of the present disclosure of the DSP block and channel performance parameter estimation, in case that the modulation format of the channel is unknown.

FIG. 6 illustrates schematically another embodiment of the present disclosure of the DSP block and channel performance parameter estimation, in a case where the modulation format of the channel is unknown. It is assumed that the channel modulation format can be selected from a set of known modulation formats, yet the currently applied modulation format is unknown. In the present embodiment, the signal samples may pass through blind DSP algorithms that are independent of the modulation format used. Data deskew, IQ imbalance, resampling, Coarse CD compensation and clock recovery, as well as an interpolation stage that may for example be carried out without the knowledge of the specific modulation format associated with the channel being monitored. Some blind algorithms may require the knowledge of the given modulation format. For example the CMA algorithm is fit for QPSK while the MMA algorithm with three radius is fit for rectangular 16-QAM. After passing the blind DSP algorithm stages that are modulation format independent, the sampled symbols are then sent to a bank of constellation dependent blind DSP sub-blocks, each being optimized for one of the modulation formats belonging to the modulation formats' set, that is suitable for the channel. FIG. 6 presents an exemplary embodiment in the case of selecting two possible modulation formats, but as will be appreciated by those skilled in the art, it may be further extended to a larger number of modulation formats by adding other constellation dependent blind DSP sub-blocks to the DSP bank. Channel performance parameter estimations such as OSNR, ESNR, preFEc BER, OSNR margin, overall link impairment are then derived for each sub-block. The sub-block that will provide the best recovered constellation diagram, will be selected, and the estimated channel performance parameter derived from the selected sub-block will be selected. One possible criterion that can be used to select the best recovered constellation diagram, is for example the estimated ESNR level. In addition, the information on the channel modulation format can be provided to the network management system.

Figure 7:
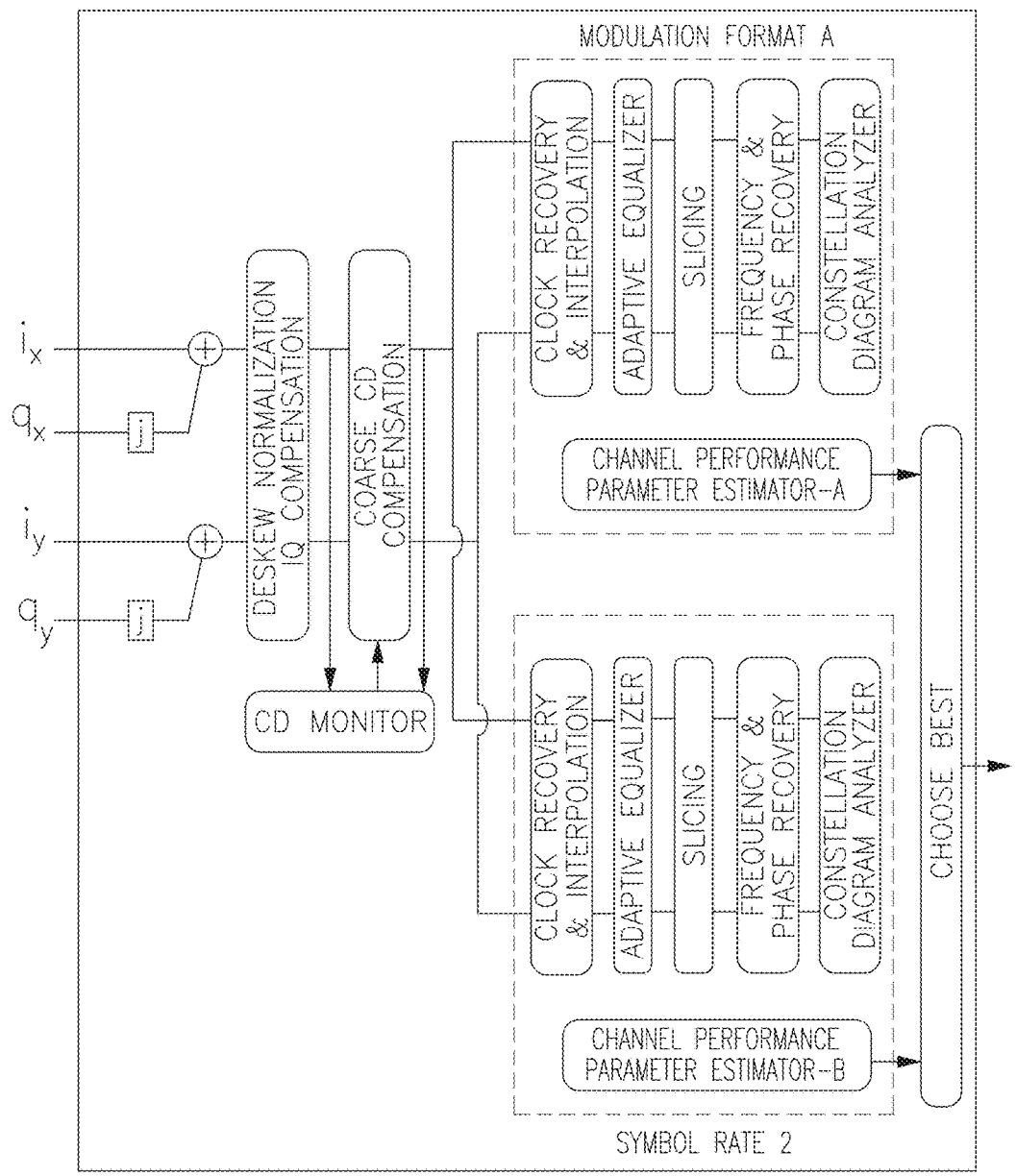
FIG. 7 illustrates schematically yet another embodiment of the present disclosure of the DSP block and channel performance parameter estimation, in case that the symbol rate of the channel is unknown.

FIG. 7 illustrates schematically another embodiment of the present disclosure of the DSP block and channel performance parameter estimation, in a case where the symbol rate of the modulation format of the channel is unknown. It is assumed that the symbol rate of the channel modulation format can be selected from a set of known symbol rates but the currently used one for that channel modulation format is unknown. In this present embodiment, the signal samples may pass through blind DSP algorithms that are independent of the symbol rate of the channel. Data deskew, IQ imbalance, Coarse CD compensation for example, can be done without information on the specific symbol rate of the modulation format of the channel to be monitored. The resampling stage can be set to the one optimized to the maximum possible symbol rate. Some blind algorithms may require the information of the symbol rate. For example, Clock recovery and interpolation procedures, Adaptive equalization for polarization recovery, PMD and PDL compensation as well as the frequency offset compensation requires information about the symbol rate. After passing the blind DSP algorithm stages that are independent of the symbol rate, the sampled symbols are then sent to a bank of symbol rate dependent blind DSP sub-block, each one being optimized for one of the symbol rate from among the symbol rate set possible for the channel. FIG. 7 demonstrates an exemplary embodiment in case of selecting two possible symbol rates, but as will be appreciated by those skilled in the art, it can be further extended to a large number of symbol rates by adding other symbol rate dependent blind DSP sub-blocks to the DSP bank. Channel performance parameter estimations such as OSNR, ESNR, preFEc BER, OSNR margin and overall link impairment, are then derived for each sub-block. The sub-block that provides the best recovered constellation diagram will be the selected one, and the estimated channel performance parameter derived from this sub-block, will be the selected one. One criterion to select the best recovered constellation diagram can be for example the estimated ESNR level. In addition, the information on the channel symbol rate can be provided to a network management element.

Figure 8:
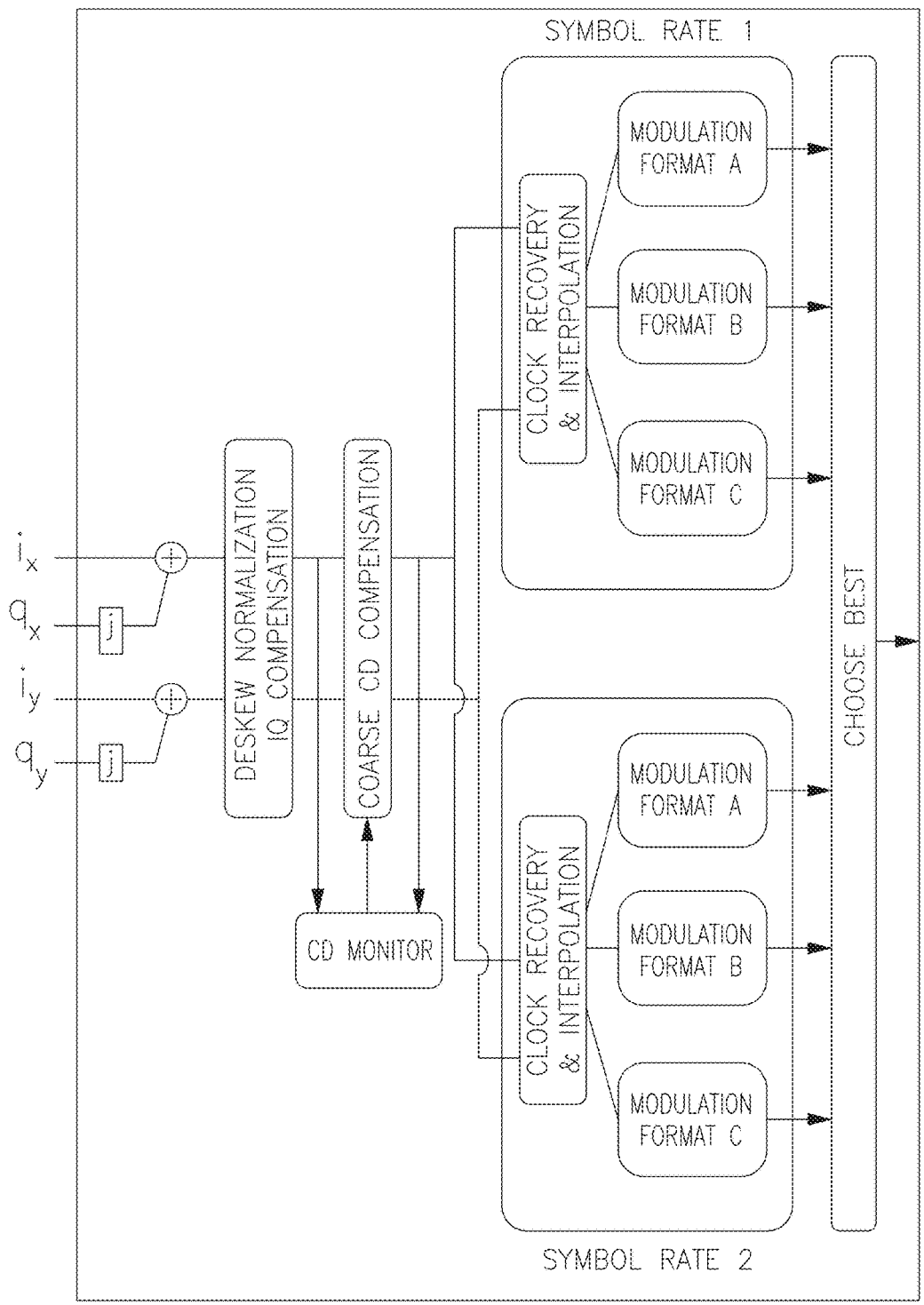
FIG. 8 illustrates schematically still another embodiment of the present disclosure of the DSP block and channel performance parameter estimation, in case that the symbol rate and the modulation format of the channel are unknown.

FIG. 8 illustrates schematically yet another embodiment of the present disclosure of the DSP block and channel performance parameter estimation, in case neither the modulation format nor the symbol rate are known. It is assumed that the symbol rate and the modulation format of the channel can be selected from among a set of known symbol rates and modulation formats but the current ones used for the modulation format are unknown. In such a case, the signal samples may pass through blind DSP algorithms that are independent of the symbol rate and modulation format of the channel. Data deskew, IQ imbalance, Coarse CD compensation for example can be done without the information of the specific symbol rate and modulation format associated with the channel being monitored. The resampling stage can be set to the one optimized to the maximum possible symbol rate.

After passing the blind DSP algorithm stages that are symbol rate and modulation format independent, the sampled symbols are then sent to a bank of symbol rate dependent blind DSP sub-block, each being optimized for one of the symbol rate belonging to the symbol rate set that are possible for the channel. In each symbol rate dependent sub-block, there are modulation format dependent blind DSP sub-block with provides the estimated channel performance parameters according to a given symbol rate and modulation format. FIG. 8 demonstrates an exemplary embodiment in a case of selecting two possible symbol rates and three possible modulation formats for each symbol rate. Still, this example may be further extended to a larger number of symbol rates and modulation formats, by adding other symbol rate dependent blind DSP sub-blocks to the DSP bank and modulation format dependent blind DSP sub-blocks in each symbol rate dependent blind DSP sub-block. Channel performance parameter estimations such as OSNR, ESNR, preFEc BER, OSNR margin, overall link impairment are then derived for each sub-block. The sub-block that provides the best recovered constellation diagram will be the selected one, and the estimated channel performance parameter of derived from this sub-block will be the one that will be used. One possible criterion for selecting the best recovered constellation diagram can be for example the estimated ESNR level. In addition, the information on the channel symbol rate and modulation format may be provided to the network management element/system.

Figure 9:
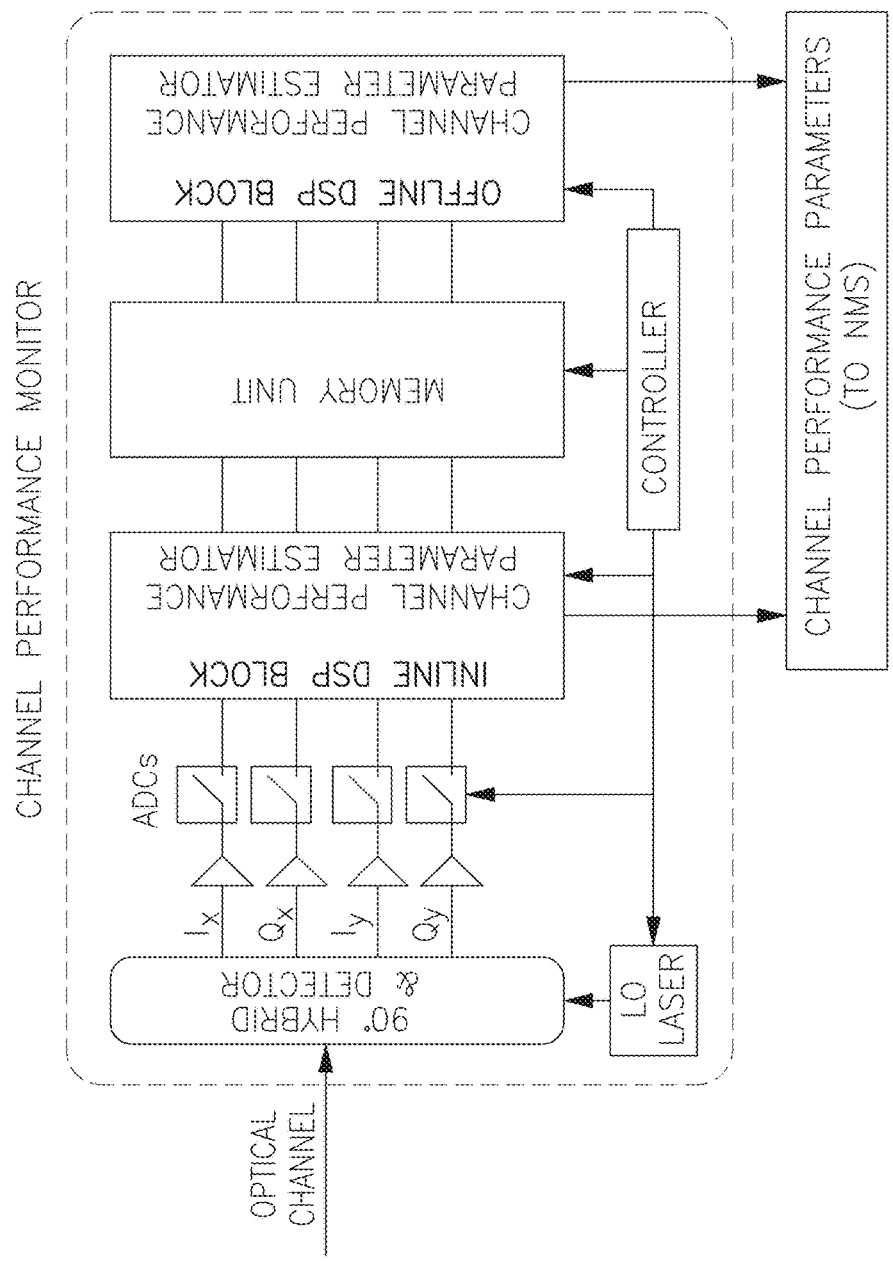
FIG. 9 illustrates a schematic implementation of another embodiment of the present disclosure by which a CPM system comprises a coherent optical receiver front end followed by ADC blocks, an inline DSP block, a memory unit and an offline DSP block. Both inline and offline DSP blocks, providing the estimation of the channel performance parameters.

FIG. 9 is a schematic illustration of still another embodiment of the present disclosure of the CPM technique based on a combination of inline DSP and offline processing of some stored samples of the detected optical signal. By this embodiment, the digitalized sampled are first sent to an inline DSP block that performs some tasks of the symbol constellation recovery process under real time conditions. This task can be related to the compensation of some impairments due to non-ideal detection processes, such as deskew, IQ imbalance, clock recovery and interpolation. Optionally, the inline DSP block may also be used to compensate some of the link impairments such as accumulated CD, polarization recovery, PMD and PDL compensation. This compensation process will also enable estimating the related channel parameter performances. The partially recovered signal samples are stored at the memory block when the appropriate write control signal is provided to the memory block. Another control signal will then cause loading of the saved sampled to the offline DSP block that performs the compensation of the remaining impairments and estimates the remaining channel performance parameters by recovering the noisy constellation diagram of the saved samples. Once again, since the processing is carried out in an offline mode, the processing rate used, may be much lower than the channel symbol rate. The resulting estimated parameters may be sent to the network management system/element for analyzing the channel quality and/or for taking further actions if required.

Figure 10:
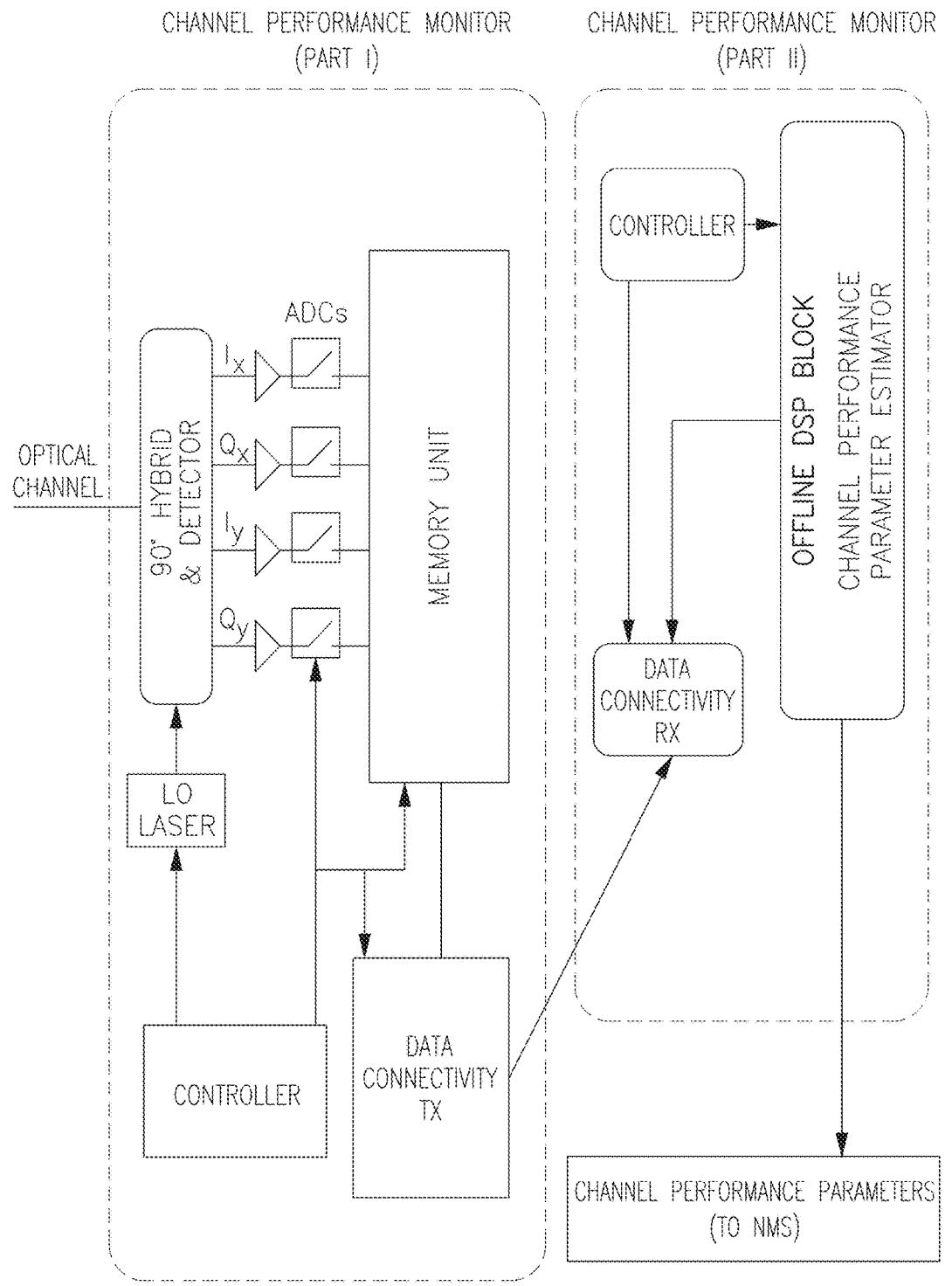
FIG. 10 demonstrates a schematic implementation of another embodiment of the present disclosure by which a CPM system comprises two distinct units: a first unit, comprising a coherent optical receiver front end followed by ADC blocks, a memory unit and a data connectivity transmitter configured to send the stored signal samples towards a second remote unit that comprises a data connectivity receiver and an offline DSP block, for providing an estimation of the channel performance parameters.

FIG. 10 is a schematic illustration of another embodiment of the present disclosure of the channel performance monitoring technique, where the channel performance monitor is divided into two distinct parts. In the first part, the signals conveyed along the channel being monitored, are forwarded to the coherent optical receiver front end. Optical to electrical conversion of the channel's signals may be carried out by using a colored or colorless method. The detected signals from the four port outputs of the optical balanced receiver are then amplified and digitalized using four high speed ADCs. The ADCs do not necessarily operate in a continuous mode. They may be activated by a control signal, for example while a channel performance monitoring is requested by the network management system. The signal samples are then stored at a memory unit when a control signal enables a writing process for storing these samples at the memory block. Another control signal will then cause loading the signal samples to a data connectivity transmitter that will allow forwarding the saved signal samples to the second part of the channel performance monitor. The second part of the channel performance monitor may be located at a different location. It may be another card connected to the chassis of the same network element platform. In such a case, the communication between the two cards can be done by implementing a backplane transmission protocol. Alternatively, the second part of the CPM can be located at a geographically remote location, e.g. at another network node, in order to perform a centralized processing of several optical network channels being monitored. In the latter case, the communication between the two CPM parts can be done by implementing a network communication protocol, for example via the Optical Supervisory Channel ("OSC"). The second part of the CPM consists of a data connectivity receiver that receives the signal samples sent by the first part of the CPM. These received signal samples are loaded to the offline DSP block that estimates the channel performance parameters by recovering the noisy constellation diagram of the saved samples.

Figure 11:
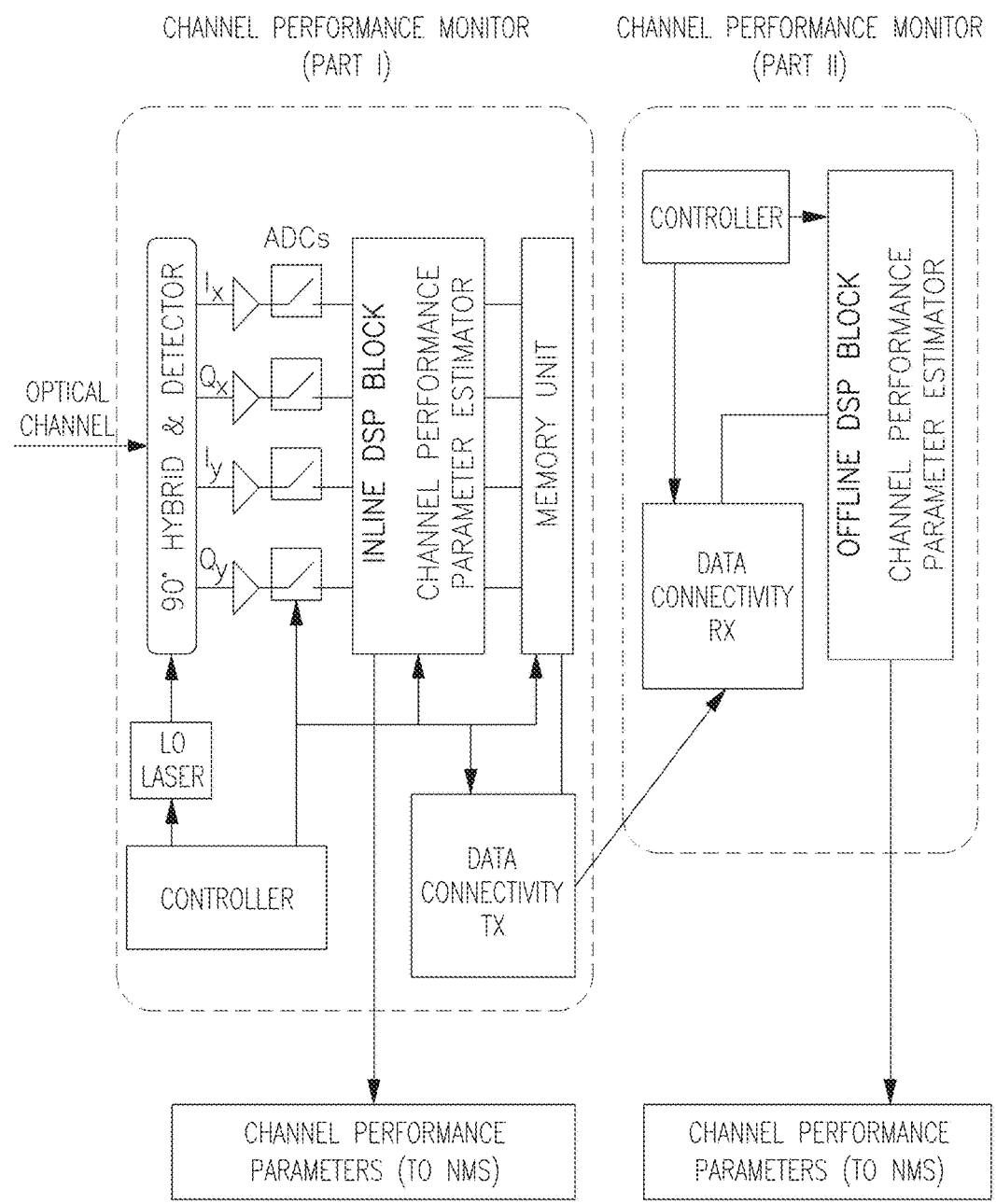
FIG. 11 illustrates a schematic implementation of another embodiment of the present disclosure wherein a CPM system comprises two distinct units: a first unit, comprising a coherent optical receiver front end followed by ADC blocks, an inline DSP block, a memory unit and a data connectivity transmitter configured to send the stored signal samples towards a second remote unit that comprises a data connectivity receiver and an offline DSP block. Both inline and offline DSP blocks are used for providing an estimation of the channel performance parameters.

FIG. 11 is a schematic illustration of another embodiment of the present disclosure of the channel performance monitoring technique where the channel performance monitor is divided into two distinct parts. In the first part, the signals conveyed along a monitored channel are forwarded to a coherent optical receiver front end. Optical to electrical conversion of the channel's signals can be done in a colored or colorless manner. The detected signals from the four port outputs of the optical balanced receiver are then amplified and digitalized using four high speed ADCs, which do not necessarily operate in a continuous mode. They may be activated by a control signal, for example when a channel performance monitoring is requested by the network management system. In the present embodiment, the digitalized samples are first conveyed to an inline DSP block that executes some of the tasks involved with the symbol constellation recovery process under real time conditions. These tasks may be related to the compensation of some impairments due to non-ideal detection processes, such as deskew, IQ imbalance, clock recovery and interpolation. Optionally, the inline DSP block can also be used to compensate some of the link impairments such as accumulated CD, polarization recovery, PMD and PDL compensation. This compensation process will also enable estimating the related channel parameter performances. The partially recovered signal samples are stored at the memory block upon receiving the appropriate write control signal at the memory block. Another control signal will then be used to initiate loading of the partially processed signal samples to a data connectivity transmitter that will enable forwarding the signal samples to the second part of the channel performance monitor. The second part of the channel performance monitor is located at a different location. This different location may be another card connected to the same chassis of the network element platform. In such a case, the communication between the two cards can be done by implementing a backplane transmission protocol. Alternatively, the second part of the CPM can be located at a geographically remote location, such as another network node, in order to perform a centralized processing of several optical network channels being monitored. In this case, the communication between the two CPM parts can be done by implementing a network communication protocol, for example via the Optical Supervisory Channel ("OSC"). The second part of the CPM consists of a data connectivity receiver that receives the signal samples forwarded by the first part of the CPM. These received partially processed signal samples are loaded to the offline DSP block that performs the compensation of the remaining impairments and estimates the remaining channel performance parameters by recovering the noisy constellation diagram of the saved samples. Once again, since the processing is done offline, the processing rate can be substantially lower than the channel symbol rate. The resulting estimated parameters can be forwarded to the network management system/element for analysis the channel quality and take further actions if needed.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. An optical communication system, comprising:
   an optical transmitter configured to transmit an optical signal along at least one optical channel;
   an optical receiver configured to receive the optical signal conveyed along the at least one optical channel;
   one or more convertors being in communication with the optical receiver and operative to convert a received signal into digitized samples thereof;
   a first Digital Signal Processing (DSP) device being in communication with at least one of the one or more convertors, and configured for in-line real time processing of at least one of the digitized samples, wherein the in-line real time processing includes performing at least partial recovery of digitized samples;
   a memory configured to store the at least partially recovered digitized samples;

a second DSP device being in communication with the optical receiver and/or with the memory and configured for offline processing of digitized samples of the optical signal and/or of the partially recovered stored samples; and wherein the offline processing includes:
using samples received to determine information characterizing the at least one optical channel used for conveying the optical signal;
using the determined information to estimate a value of at least one optical channel performance parameter characterizing the at least one optical channel; and
forwarding the value of the at least one optical channel performance parameter to a network management element; and wherein the at least one optical channel performance parameter is estimated without a prior knowledge of information on a modulation format associated with the optical channel.

2. The optical communication system of claim 1, wherein the at least partial recovery of digitized samples is performed by the first DSP device without a prior knowledge of information on a modulation format associated with the optical channel.

3. The optical communication system of claim 1, wherein the at least one optical channel performance parameter is either Electrical Signal-to-Noise Ratio (ESNR) and/or preFEC Bit Error Rate (BER) and a respective estimation thereof is carried out without any knowledge of information that relates to which symbols were used while conveying the optical signal.

4. The optical communication system of claim 1, wherein the at least one optical channel performance parameter is either Electrical Signal-to-Noise Ratio (ESNR) and/or preFEC Bit Error Rate (BER), and a respective estimation thereof is carried out without any knowledge of information that relates to which bits were used while conveying the optical signal.

5. The optical communication system of claim 1, wherein said first DSP device is further operative to compensate for at least one impairment of the optical channel along which the optical signal had been conveyed.

6. The optical communication system of claim 5, wherein said first DSP device is further operative to blindly estimate a value of at least one optical channel performance parameter characterizing the at least one optical channel, following the compensation provided for the at least one impairment of the optical channel.

7. The optical communication system of claim 1, wherein the first DSP device is installed at the optical receiver and the second DSP device is located separately therefrom.

8. The optical communication system of claim 7, wherein the first DSP device is installed at the optical receiver and the second DSP device is installed at a geographically remote location.

9. The optical communication system of claim 1, wherein the at least one optical channel performance parameter characterizing the at least one optical channel is a member of the group that consists of: modulation format, symbols rate, spectral shaping, and any combination thereof.

10. The optical communication system of claim 1, wherein the at least one optical channel performance parameter includes one or more of the following: Optical Signal to Noise Ratio (OSNR), Electrical Signal-to-Noise Ratio (ESNR), OSNR system margin, ESNR system margin, overall link impairment strength, Accumulated Chromatic Dispersion (ACD), Polarization Mode Dispersion (PMD), Polarization Dependent Loss (PDL), preFEC Bit Error Rate (BER).

11. A method for carrying out channel performance monitoring in an optical communication system, the method comprising:
receiving an optical signal;
obtaining digitized samples associated with the optical signal;
storing the digitized samples;
carrying out an offline processing of the stored samples, wherein the offline processing includes:
using the digitized samples to determine information characterizing the at least one optical channel used for conveying the optical signal;
using the determined information to estimate a value of at least one optical channel performance parameter characterizing the at least one optical channel; and
forwarding the value of the at least one optical channel performance parameter to a network management element; and
wherein the at least one optical channel performance parameter is estimated without a prior knowledge of information on a modulation format associated with the optical channel.

12. The method of claim 11, wherein the at least one optical channel performance parameter is either Electrical Signal-to-Noise Ratio (ESNR) and/or preFEC Bit Error Rate (BER), and a respective estimation thereof is carried out without any knowledge of information that relates to which symbols were used while conveying the optical signal.

13. The method of claim 11, wherein the at least one optical channel performance parameter is either Electrical Signal-to-Noise Ratio (ESNR) and/or preFEC Bit Error Rate (BER), and a respective estimation thereof is carried out without any knowledge of information that relates to which bits were used while conveying the optical signal.

14. The method of claim 11, further comprising:
carrying out a real time in-line processing of at least a portion of the optical signal received, wherein the in-line processing includes performing at least partial recovery of digitized samples.

15. An apparatus configured to enable off-line digital performance monitoring, which comprises a digital signal processing (DSP) device configured to:
access a memory to retrieve stored samples of an optical signal;
use the retrieved samples to determine information characterizing the at least one optical channel used for conveying the optical signal;
use the determined information to estimate a value of at least one optical channel performance parameter characterizing the at least one optical channel; and
forward the value of the at least one optical channel performance parameter to a network management element; and
wherein the at least one optical channel performance parameter is estimated without a prior knowledge of information on a modulation format associated with the optical channel.

16. The apparatus of claim 15, wherein the at least one optical channel performance parameter is either Electrical Signal-to-Noise Ratio (ESNR) and/or preFEC Bit Error Rate (BER) and a respective estimation thereof is carried out without any knowledge of information that relates to which symbols were used while conveying the optical signal.

17. The apparatus of claim 15, wherein the at least one optical channel performance parameter is either Electrical Signal-to-Noise Ratio (ESNR) and/or preFEC Bit Error Rate (BER), and a respective estimation thereof is carried out without any knowledge of information that relates to which bits were used while conveying the optical signal.

18. The apparatus of claim 15, wherein the stored samples were at least partial recovered by another DSP device configured for carrying out an in-line processing.

19. The apparatus of claim 15, wherein the at least one optical channel performance parameter includes one or more of the following: Optical Signal to Noise Ratio (OSNR), Electrical Signal-to-Noise Ratio (ESNR), OSNR system margin, ESNR system margin, overall link impairment strength, Accumulated Chromatic Dispersion (ACD), Polarization Mode Dispersion (PMD), Polarization Dependent Loss (PDL), preFEC Bit Error Rate (BER).

\* \* \* \* \*